(12) United States Patent
Walker et al.

(10) Patent No.: US 8,310,408 B1
(45) Date of Patent: Nov. 13, 2012

(54) SYSTEM AND METHOD FOR GRAPHICAL USER INTERFACE AND DISPLAY AMONG DIFFERENT ASPECT RATIO VIDEO DISPLAY DEVICES

(75) Inventors: Scott Walker, Decatur, GA (US); Harry Allison, Atlanta, GA (US); Kenn Trezek, Acworth, GA (US); Barry Millsapp, Dallas, GA (US); Peter Knapp, Lilburn, GA (US); Shane Long, Kennesaw, GA (US); Eric Bernhardt, Olney, MD (US)

(73) Assignee: Waveguide Consulting, Incorporated, Decatur, GA (US)

( * ) Notice: Subject to any disclaimer, the term of this patent is extended or adjusted under 35 U.S.C. 154(b) by 420 days.

(21) Appl. No.: 12/553,552

(22) Filed: Sep. 3, 2009

Related U.S. Application Data

(60) Provisional application No. 61/113,752, filed on Nov. 12, 2008.

(51) Int. Cl.
*G11G 5/00* (2006.01)
(52) U.S. Cl. ....................................................... 345/3.3
(58) Field of Classification Search .......................... None
See application file for complete search history.

(56) References Cited

U.S. PATENT DOCUMENTS

| | | | |
|---|---|---|---|
| 5,594,467 A * | 1/1997 | Marlton et al. | 345/641 |
| 6,141,003 A | 10/2000 | Chor et al. | |
| 6,664,983 B2 | 12/2003 | Ludolph | |
| 7,058,891 B2 | 6/2006 | O'Neal et al. | |
| 7,144,133 B2 * | 12/2006 | Bierhuizen | 362/293 |
| 7,830,401 B2 * | 11/2010 | Sonobe | 345/699 |
| 2002/0078459 A1 | 6/2002 | McKay | |
| 2003/0122860 A1 * | 7/2003 | Ino | 345/716 |
| 2005/0117121 A1 * | 6/2005 | Meerleer | 353/30 |
| 2005/0219416 A1 * | 10/2005 | Gielow | 348/556 |
| 2006/0277478 A1 | 12/2006 | Seraji et al. | |
| 2008/0273035 A1 * | 11/2008 | Suen et al. | 345/428 |
| 2009/0190027 A1 * | 7/2009 | Delia et al. | 348/445 |
| 2009/0268986 A1 * | 10/2009 | Holstein et al. | 382/305 |
| 2010/0013950 A1 * | 1/2010 | Kikuchi | 348/222.1 |
| 2010/0099485 A1 * | 4/2010 | Sommer et al. | 463/25 |
| 2010/0149216 A1 * | 6/2010 | Dutta et al. | 345/660 |
| 2010/0225818 A1 * | 9/2010 | Ferguson | 348/607 |

* cited by examiner

*Primary Examiner* — Joseph Feild
*Assistant Examiner* — Henok Heyi
(74) *Attorney, Agent, or Firm* — Hunton & Williams LLP

(57) ABSTRACT

A first presenting display device of a first aspect ratio includes a predefined pixel region for a display area, such as displaying video image content from one or more video input devices, and a graphical user control interface within a predefined pixel area representing the pixel area difference between the first display device and the predefined pixel region for the display area. A second display device has an aspect ratio matching the pixel region for the display area of the first device. Content from the display area of the first device is simultaneously displayed on the full display of the second device without the graphical user control interface.

20 Claims, 4 Drawing Sheets

SYSTEM AND METHOD FOR GRAPHICAL USER INTERFACE AND DISPLAY AMONG DIFFERENT ASPECT RATIO VIDEO DISPLAY DEVICES

CROSS-REFERENCE TO RELATED APPLICATION

The present application claims the benefit of priority of U.S. Provisional Application No. 61/113,752 filed Nov. 12, 2008, which is incorporated herein by reference.

FIELD OF THE INVENTION

This invention is related in general to the field of audiovisual systems, particularly to the control and display of sources in an audiovisual system.

BACKGROUND

Conventional audiovisual systems utilizing a presenter display device and one or more audience display devices typically require that both the content desired to be presented and controls for such content and audiovisual devices simultaneously appear on all of the presenter and audience devices or that a presenter utilize several control and display devices, such as an additional audiovisual system control device, for a presentation.

In instances where controls appear together with the intended presentation content on the audience devices, such control elements distract from the presentation and reduce the display "real estate" in which the content can be displayed on the audience display devices.

Often such distractions are further complicated by a presenter display device having a different aspect ratio than the audience display device. For example, a presenter may utilize a 16:10 wide aspect ratio computer monitor display, including many touch screen devices, while an audience is viewing a 16:9 wide aspect ratio conventional wide screen video display. In addition to distraction by the displayed controls, the different display aspect ratios can result in video image distortion and other visual discrepancies between the display devices.

It is therefore desirable in an audiovisual presentation system to present a single congruous interface to the presenter that displays the content of the presentation along with controls for the presentation on the same visual display without displaying those controls to the presentation audience on audience display devices. It is also desirable to enable the user to access additional functions presented on the interface by grouping the additional functions on a graphical container that provides sub-menus from the region where the user selected a button enabling that sub-menu group of functions.

SUMMARY OF THE INVENTION

The invention in one embodiment is a method to display a graphical user interface (GUI) for control of an audiovisual system in the pixel difference area between the 16:10 wide aspect ratio of a computer display monitor and the 16:9 wide aspect ratio of a high-definition, large-format display monitor or projector. While in one described embodiment the 120 pixel difference area of a 1920×1200 computer display and 1920×1080 convention projector/display monitor provides the GUI for control and the remaining pixel area provides a display area, the GUI can reside in the difference area of other aspect ratios in other embodiments of the invention.

In embodiments of the invention, the graphical user interface is displayed on a presenter video display device from a graphics display file and operation code defining graphics to represent a multitude of discrete buttons that can receive control inputs, including touched by a touch screen, actuated by input devices and the like. In embodiments the graphics display file and operation code reside as computer readable instructions on a graphics display processor device defining graphics to represent a multitude of discrete function buttons receiving controls inputs, such as touched using a touch sensitive overlay on a 16:10 display monitor. The touch to the touch sensitive overlay for user's selection of a button correlates to a location in a pixel map defined in the graphics display file. In embodiments, buttons represent specific actions to be performed by the audiovisual control system.

The present invention in embodiments enables typical high-definition and standard-definition one or more input sources to be displayed in the 16:9 area (display area) of the 16:10 display monitor while simultaneously displaying the user interface in the remaining pixel area (16:1) without obscuring any of the input source(s) in the display area. Input sources include in non-limiting examples digital and analog video sources, such as DVD players, satellite and cable video devices, laptop and personal computers, media player devices, video storage devices and other devices providing data for video images. It will be appreciated that video images rendered from input sources in embodiments of the invention include a wide variety of stationary and moving visual images transmitted in a video signal, including but not limited to, television broadcasts and recordings, motion pictures, computer screen images, web pages, photographic images, graphics, software application screens, slide presentations, digital documents and the like.

In various embodiments, the graphical user interface of the pixel difference area is placed either above or below the display area.

Because in embodiments the graphical user interface is displayed in an area outside of the typical 16:9 area of the large-format display monitor or projector, the graphical user interface is not shown on the large-format display monitor or projector, such as to an audience viewing a large 16:9 display while a presenter operates a 16:10 computer display monitor presenting display with the GUI and display areas.

In embodiments of the invention a computer display monitor presenting display includes a GUI and video images display area and is also a touch screen device. In other embodiments, mice, keyboards and other conventional inputs may be used with or as an alternative to a touch screen device.

In embodiments of the invention, an audiovisual presentation system includes one or more video processing devices such as a video cropping processor device, that remove or ignore the pixel difference between the two aspect ratios of display devices, such as, but not limited to, between a 16:10 computer display presenting device and 16:9 large-format audience display monitor/projector. In such embodiments, the user interface in the 16:1 pixel difference area is visible only to the presenter while the content of the presentation displayed in the 16:9 area of the 16:10 display monitor is displayed to the presentation audience on a 16:9 display device. In some embodiments, a video cropping processor is an independent device from the graphics processor device. In other embodiments, the video cropping processor is integrated as a single device with the graphics processor device.

An object of the invention includes providing a single congruous display and control interface to a presenter as an improvement over multiple display and control interfaces.

A further aspect of the invention is including additional sub-menu functions of the graphical user interface by, in one embodiment of the invention, revealing those functions through the use of revealing a graphical container that slides from the region where the user selected a button enabling that group of functions. In embodiments, additional revealed functions (such as other sub-menus of buttons) are strictly confined to display within the GUI pixel difference area so as not to appear in the display area. In further embodiments of the invention, control inputs to a presenter device, such as mouse control inputs of a cursor, annotations/markings to a touch screen, and the like, are shown on both a presenter display device and audience display device.

BRIEF DESCRIPTION OF THE DRAWINGS

These and other features and aspects of exemplary embodiments of the invention will become evident when the following detailed description is read with reference to the accompanying drawings wherein.

DETAILED DESCRIPTION OF THE INVENTION

Embodiments of the invention will be described with reference to the accompanying drawings and figures wherein like numbers represent like elements throughout. Further, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. The terms "mounted", "connected", and "coupled" are used broadly and encompass both direct and indirect mounting, connecting and coupling. Further, "connected" and "coupled" are not restricted to physical or mechanical connections or couplings, and include without limitation wired, wireless and other network interconnectivity.

Figure 1A:
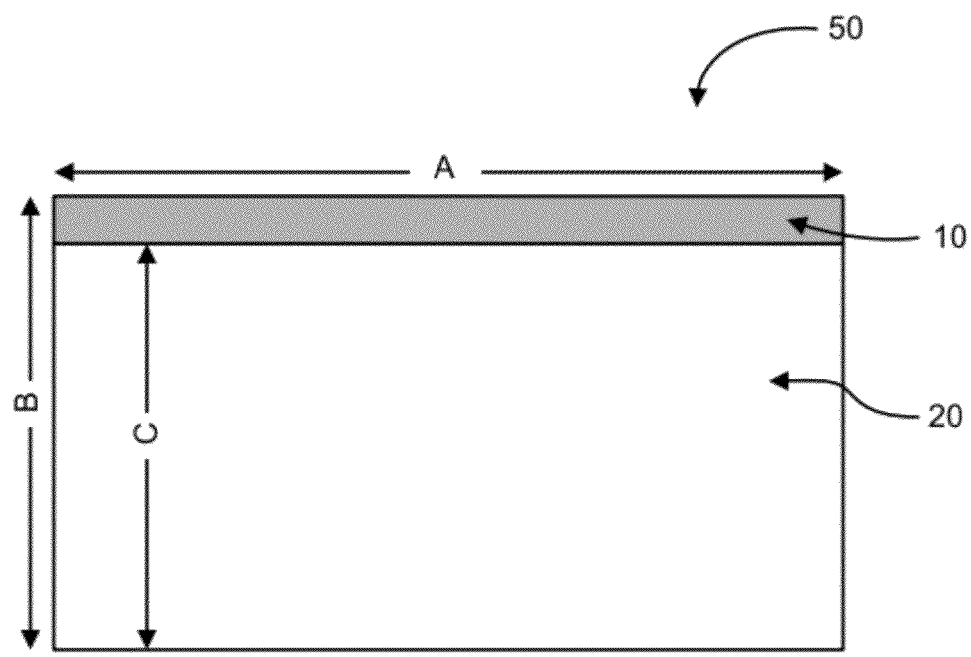
FIG. 1A is a schematic diagram of a display device including a 16:10 aspect ratio with 16:9 display area and top-oriented graphical user interface in a 16:1 pixel difference area in one embodiment of the invention.
Figure 1B:
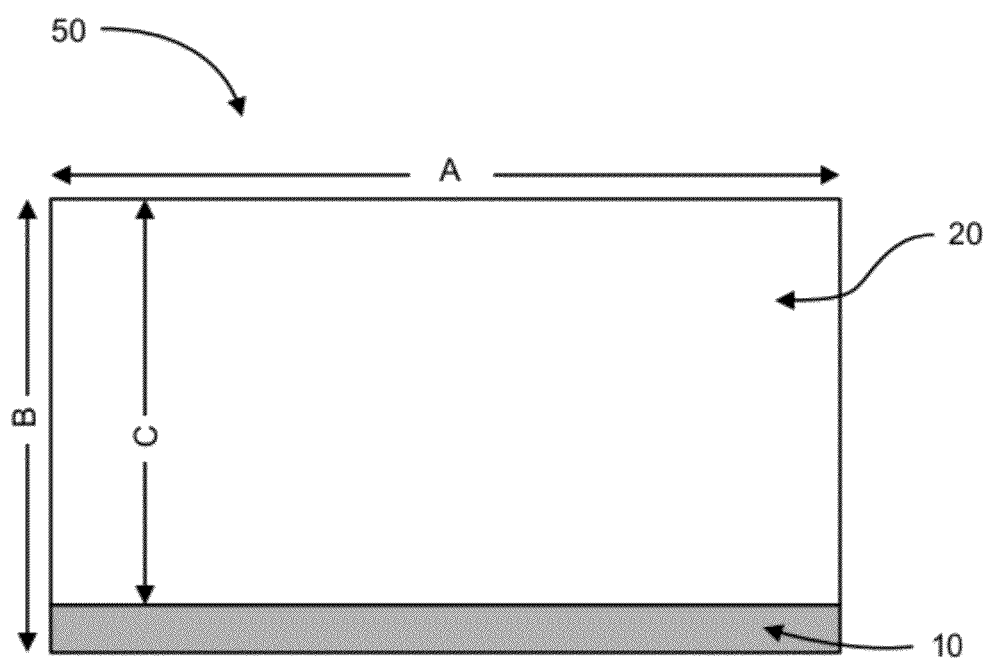
FIG. 1B is a schematic diagram of a display device including a 16:10 aspect ratio with 16:9 display area and bottom-oriented graphical user interface in a 16:1 pixel difference area in one embodiment of the invention.
Figure 2:
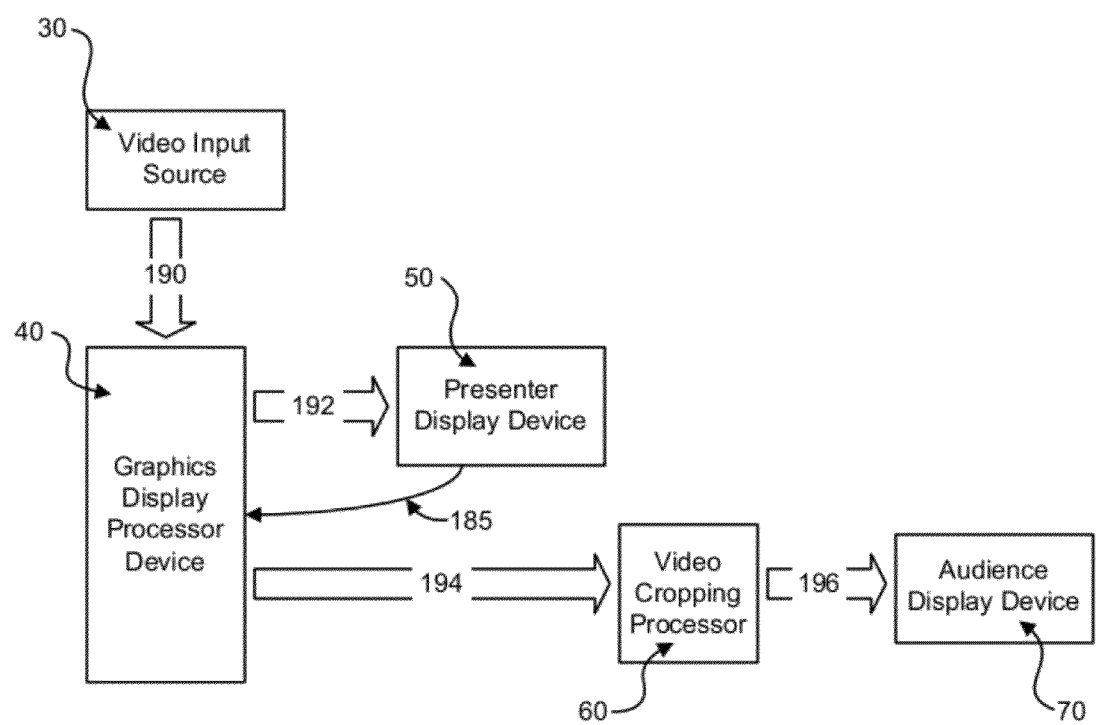
FIG. 2 is a relational block diagram of input sources, presentation and audience display devices, a graphics display processor device and video cropping processor device in a system according to one embodiment of the invention.
Figure 3:
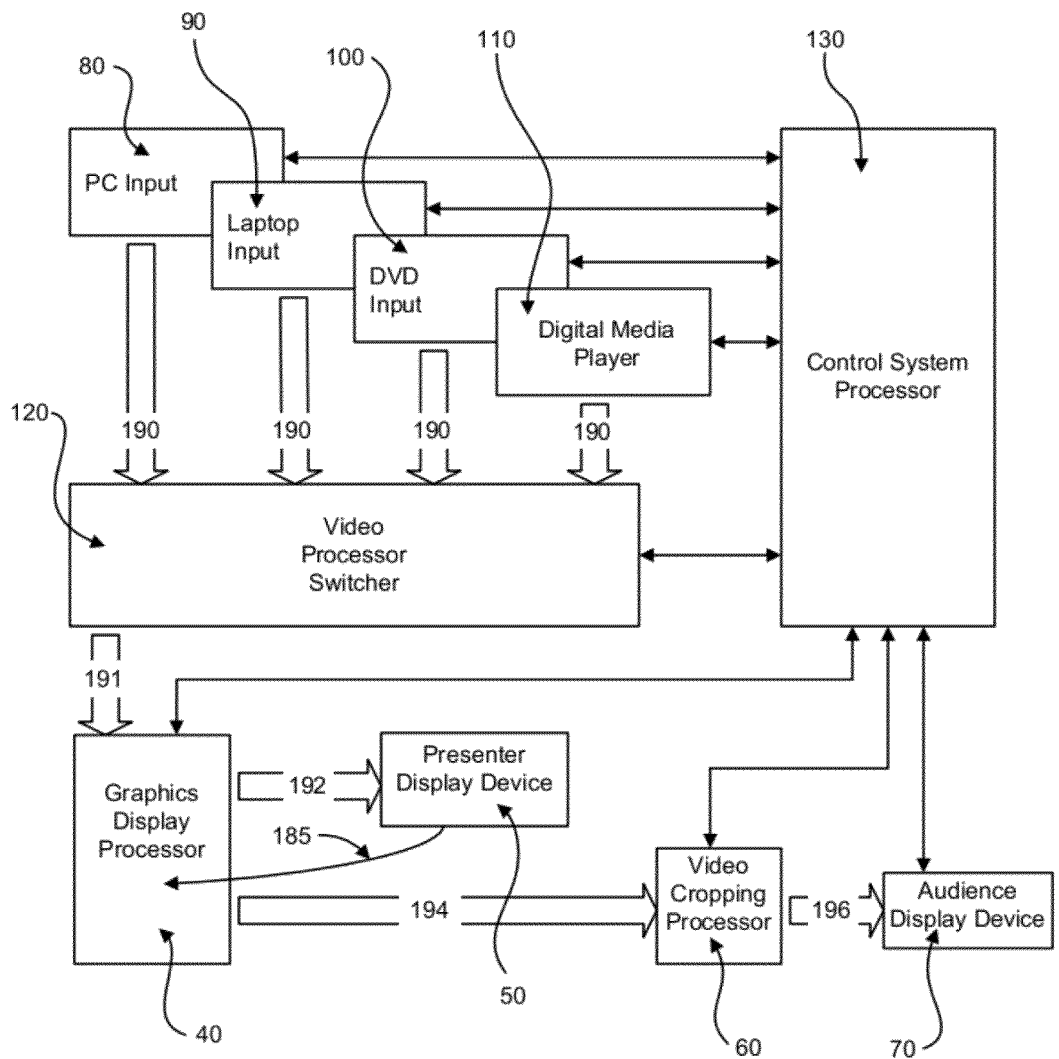
FIG. 3 is a relational block diagram of input sources, video processor switcher, presentation and audience display devices, graphics display processor device, video cropping processor device, and interconnections with a control system processor device according to one embodiment of the invention.

Referring to FIGS. 1A and 1B, a graphical user interlace 10 is displayed between the pixel area difference 16:10 (A:B) aspect ratio of a video display device 50, such as a presenting computer display monitor, and 16:9 (A:C) aspect ratio of a video image display area 20 according to one embodiment of this invention. The location of a GUI 10 can be set programmatically or can be fixed at the top or bottom of the video display device 50 as described in a graphics display file stored on a connected graphics display processor device 40 such as shown in FIGS. 2 and 3. In one embodiment, this graphics display file is specifically programmed using software available from the manufacturer of the graphics display processor 40. In one embodiment, the files are a proprietary format and executed in the graphics display processor 40 for display on display device 50.

FIG. 2 is a basic block diagram device showing the relationship of devices in the system and flow of video signals 190, 192, 194 and 196 through the system.

In one embodiment of the system, graphics display processor device 40 is a specialized computer programmed with VisionTools Pro-e and SIMPL Windows by Crestron Electronics Inc. (Rockleigh, N.J.); or, in another non-limiting embodiment, the programming could be done using TPDesign4 and NetLinx Studio by AMX Corporation (Richardson, Tex.). In embodiments, and with further reference to FIG. 3, video display device 50 uses a touch sensitive overlay that provides coordinate data to the graphics display processor 40. This data correlates in various embodiments the location touched by the user to the location of a graphical element of GUI 10 representing a function to be executed by a control system processor device 130 or the graphics display processor 40.

With continuing reference to FIG. 2, the graphics display processor 40 can accept video signals 190 from multiple video signal input sources 30, as determined by the manufacturer of device 40, such as, but not limited to, the TPI-Pro by AMX or the DVP-HD by Crestron. Video images from video input sources 30 are represented by data in analog or digital video signal 190 received by graphics display processor 40. The video images are displayed in video display area 20 as described in a graphics display file as 1920 pixels wide (A) by 1080 pixels high (C) representing a 16:9 (A:C) aspect ratio. The graphics display processor 40 also displays the GUI 10 in the 120 pixel difference area between video display area 20 and the 1920 pixel wide (A) by 1200 pixel high (B) total resolution of a presenting display device 50. The display device 50 receives a video signal 192 from graphics display processor 40 that provides data representing the total 16:10 (1920×1200) (A:B) pixel image including the user interface 10 and the video images display area 20. The display device 50 also provides, in certain embodiments, touch coordinate control inputs 185 to graphics display processor 40 to provide selection of function buttons 140 on GUI 10. Graphics display processor 40 also provides a video signal 194 to video cropping processor 60, such as, but not limited to, the Indie IND 400 HD from FSR Inc. (Woodland Park, N.J.), which removes or ignores pixel difference area including GUI 10 between the 16:10 (A:B) and 16:9 (A:C) aspect ratios for display on an audience display device 70, such as a widescreen 16:9 aspect ratio display receiving video signal 196.

Referring again to FIG. 3, a block diagram depicts discrete video input sources 30, including personal computer (PC) input source 80, laptop input source 90, digital video display (DVD) input source 100, and digital media player input source 110. These sources can be any source or sources with a compatible resolution and signal type to those accepted by the video cropping processor 60, video switching processor 120 and graphics display processor 40.

Referring again to FIGS. 1A and 1B, video images from input sources 30 may be displayed in display area 20 as a single window or multiple windows. A graphics display file and/or operation code is programmed with a mathematical algorithm to size multiple windows appropriately to maintain an equal pixel height of multiple windows of equal or differing aspect ratios. The common (equal) pixel height equals nearest whole number of the result of the pixel width of the display 50 divided by the sum of ratio of the windows. This common pixel height is then multiplied by the ratio of each window to determine the width of each window.

With reference again to FIG. 3, in one non-limiting embodiment, video processor switcher 120, such as, but not limited to, the Quattro Vue FX from Analog Way Inc. (New York, N.Y.), accepts, switches and processes video signal 190 prior to transmitting video signal 191 to the graphics display processor 40.

In one non-limiting embodiment, a control system processor device 130, such as, but not limited to, the Pro2 from Crestron, communicates with the graphics display processor 40 to process the operation code (programming) relating the touching of a button displayed by the graphics display processor 40 on presenter display device 50. This operation code describes the functions and messages, including one or more control commands, transmitted to one or more of devices 60 through 120 as necessary to cause function represented by an interface button 140 on the GUI 10 be executed. In one embodiment, a control command includes instructions to at least one video signal generating device to transform data content of one or more video signals. Such transformation may include without limitation changing a broadcast channel, pausing video images, switching a video source and the like.

Figure 4A:
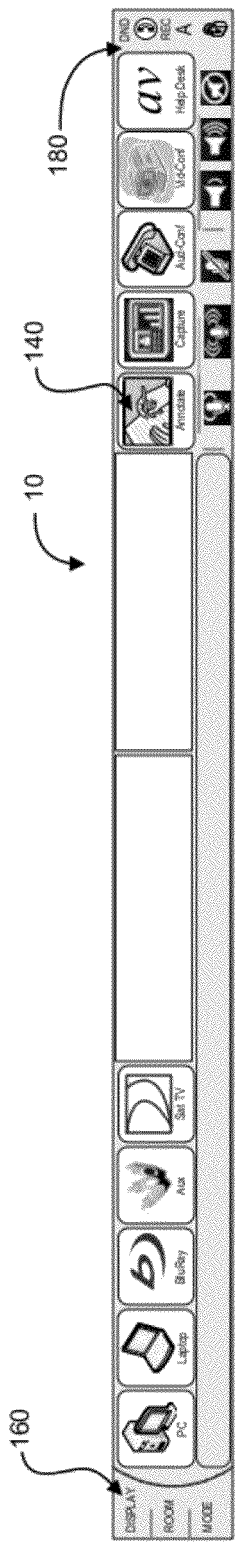
FIG. 4A is a plan view of a screen presentation of a graphical user interface with revealed functions before animation of a sub-menu interface begins in an embodiment of the present invention.
Figure 4B:
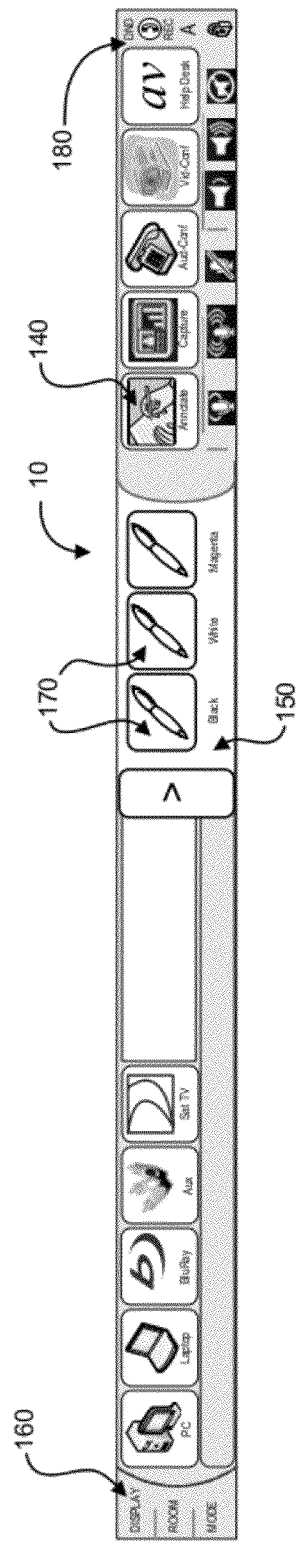
FIG. 4B is a plan view of a screen presentation of a graphical user interface with revealed functions in an embodiment of the present invention.
Figure 4C:
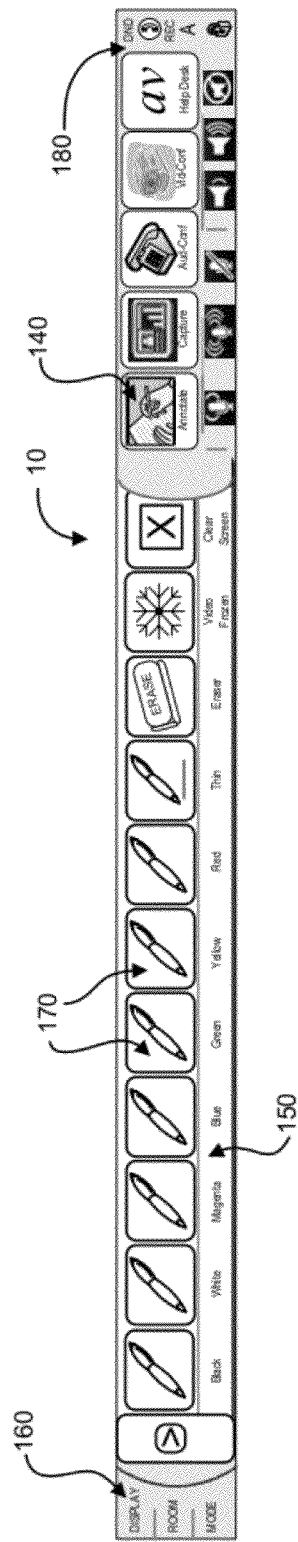
FIG. 4C is a plan view of a screen presentation of a graphical user interface with revealed functions in an embodiment of the present invention.

FIGS. 4A-4C show a series of screen representations of GUI 10 that represent an animation which occurs over time illustrating the association between a button 140 on a GUI 10 and how touching a button 140 will reveal a sub-menu depicted in container 150 that provides access to additional functions (buttons) 170 associated with the selected button 140. The time for this animation can be varied programmatically in a graphics display file and/or operation code.

FIGS. 4A-4C also show locations for specific status indicator devices and tools which will remain in a fixed area regardless of any containers that are displayed. In one embodiment, status area 180 which resides in the right most forty pixels of the GUI 10 shows indicators to provide feedback as to the state of specific functions in the system which in one non limiting embodiment such as "Do Not Disturb" status, audio-conference phone status, recording status, annotation status, and lock mode status. In one embodiment, the left most one hundred twenty pixel region 160 of the GUI 10 is reserved for tools that can be used in the operation of the audiovisual system. In one non-limiting embodiment these tools of region 160 may provide access to additional functions relating to the control of the display, control of the room or mode of operation of the audiovisual system.

With continuing reference to FIGS. 4A-4C, annotation can be selectively displayed on display area 20 (FIGS. 1A and 1B) of a system with controls located in the pixel difference area of a GUI 10. Display area 20 of the system shows annotations, but not the GUI 10 and such annotations are shown on the audience display device 70 without GUI 10. In one non-limiting embodiment the graphics display processor 40, such as the DVP-HD from Crestron, provides annotation capability from computer-readable and executable instructions on the processor 40. In other embodiments it will be appreciated that additional and/or alternative visual control inputs to annotations, such as mouse inputs, pointers, keyboard text inputs, and the like, may appear in display area 20, such as overlaying video images, and also be shown on the audience display device 70, but the GUI 10 is only shown on the presenter display device 50.

Although the invention herein has been described with reference to particular embodiments, it is to be understood that these embodiments are merely illustrative of the principals and applications of the present invention. Accordingly, while the invention has been described with reference to the structures and processes disclosed, it is not confined to the details set forth, but is intended to cover such modifications or changes as may fall within the scope of the following claims.

Finally, values described in the embodiments of the invention are merely exemplary and, as known by those of ordinary skill in the art, may be modified as desired while still remaining within the spirit and scope of embodiments of the invention.

What is claimed is:

1. A method for displaying a graphical user interface and video among physical video display devices with different aspect ratios comprising:
   receiving at least one video input signal from a video input source device to a graphics display processor device;
   transmitting from the graphics display processor device to a first video display device with a first aspect ratio at least one first display video signal including data representing video images from data of the at least one video input signal to be displayed in a first pixel area and data representing a graphical user interface to be displayed in a second pixel area;
   displaying on the first video display device the video images in the first pixel area together with the graphical user interface in the second pixel area from the at least one first display video signal;
   creating on the graphics display processor device an intermediate video display signal including data representing video images from data of the at least one video input signal to be displayed in a first pixel area and data representing the graphical user interface to be displayed in the second pixel area;
   receiving the intermediate video display signal to a video cropping processor and transforming the intermediate video display signal to a second display video signal including data representing video images from data of the at least one video input signal in a first pixel area and without data representing the graphical user interface; and
   displaying on a second video display device video images from the at least one video input signal received from the video cropping processor, wherein the second video display device includes a second aspect ratio different from the first aspect ratio of the first video display device.

2. The method of claim 1, wherein the video cropping processor is an independent device from the graphics display processor.

3. The method of claim 1, further comprising receiving visual control input to the video images in the first pixel area shown on the first display device, creating the intermediate video display signal to include data representing the visual control input, including data representing the visual control input in the second display video signal, and displaying the visual control input on the second display device together with the video images.

4. The method of claim 3, wherein the first display device is a touch screen control input device.

5. The method of claim 4, wherein the first display device has an aspect ratio of 16:10 and the second display device has an aspect ratio of 16:9.

6. The method of claim 1, wherein the first display device has an aspect ratio of 16:10 and the second display device has an aspect ratio of 16:9.

7. The method of claim 6, wherein the second pixel area has a pixel area size that is the difference between the total pixel area of the first display device and the total pixel area of the second display device.

8. The method of claim 1, wherein the second pixel area has a pixel area size that is the difference between the total pixel area of the first display device and the total pixel area of the second display device.

9. The method of claim 1, further comprising receiving control input initiating a function graphically represented on the graphical user interface displayed on the first video display device to a control system processor device including computer readable instructions for transmitting a control command to at least one video signal generating device to execute the function, transmitting a control command from the control system processor device to at least one video signal generating device and transforming data content of a video signal output from the at least one video signal generating device according to the function.

10. The method of claim 1, further comprising receiving control input to the graphics display processor device selecting a sub-menu of the graphical user interface and transforming the display of the graphical user interface on the first display device to display the sub-menu only within the second pixel area.

11. A system for displaying a graphical user interface and video among physical video display devices with different aspect ratios comprising:
   a graphics display processor device coupled to a first video display device and receiving creating a first video signal including data representing both video images in a predefined video display region and a graphical user interface within a predefined pixel area adjacent the predefined video display region;
   the first video display device displaying both the video images in the predefined video display region and the graphical user interface within the predefined pixel area adjacent to the predefined video display region;
   a video cropping processor coupled to the graphics display processor device receiving and cropping the first video signal and transmitting a second video signal including data representing the video images in the predefined video display region without data representing the graphical user interface to one or more other video display devices having a different device display aspect ratio from the first video display device; and
   a second video display device of the one or more other video display devices displaying the video images in the predefined video display region without displaying the graphical user interface while the first video display device is simultaneously displaying both the video images in the predefined video display region and the graphical user interface.

12. The system of claim 11, wherein the first video display device is a touch screen control input device.

13. The system of claim 12, further comprising a control system processor device including computer-readable instructions for transmitting a control command coupled to the first video display device.

14. The system of claim 11, further comprising a control system processor device including computer-readable instructions for transmitting a control command coupled to the first display device.

15. The system of claim 14, further comprising a control system processor device coupled to one or more video input devices, wherein said one or more video input devices are coupled to the graphics display processor device.

16. The system of claim 12, further comprising visual control inputs to the predefined video display region of the first video display device simultaneously graphically represented and overlaying the video images displayed on both of the first and second video display devices.

17. The system of claim 11, wherein the graphics display processor device and video cropping processor are independent devices.

18. The system of claim 11, wherein the graphics display processor device and video cropping processor are included in an integrated single device.

19. A video display device displaying at least a portion of a main menu of a graphical user interface including graphical controls for controlling video images within a predefined control interface pixel area and displaying the video images within a predefined video display pixel area adjacent to the control interface pixel area, wherein said video display device is simultaneously displaying at least a portion of a sub-menu graphical interface of the main menu of the graphical user interface only within the predefined control interface pixel area, and wherein the control interface pixel area is a 16:1 aspect ratio pixel difference area between a 16:10 aspect ratio of the video display device and a 16:9 aspect ratio of a second video display device.

20. The system of claim 11, wherein the first display device has an aspect ratio of 16:10 and the second display device has an aspect ratio of 16:9.

* * * * *